United States Patent
Stapleton

(10) Patent No.: US 12,177,197 B1
(45) Date of Patent: *Dec. 24, 2024

(54) QUANTUM AND CLASSICAL CRYPTOGRAPHY (QCC) FOR DATA ENCRYPTION AND DATA DECRYPTION

(71) Applicant: Wells Fargo Bank, N.A., San Francisco, CA (US)

(72) Inventor: Jeffrey J. Stapleton, Arlington, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 17/872,470

(22) Filed: Jul. 25, 2022

Related U.S. Application Data

(63) Continuation of application No. 16/546,969, filed on Aug. 21, 2019, now Pat. No. 11,399,017.

(51) Int. Cl.
 *H04L 9/40* (2022.01)
 *G06F 9/455* (2018.01)

(52) U.S. Cl.
 CPC .......... *H04L 63/0471* (2013.01); *G06F 9/455* (2013.01)

(58) Field of Classification Search
 CPC .................................................. H04L 63/0471
 See application file for complete search history.

(56) References Cited

U.S. PATENT DOCUMENTS

| | | | |
|---|---|---|---|
| 9,264,404 B1 | 2/2016 | Lambert et al. | |
| 9,781,541 B2 | 10/2017 | Kotecha et al. | |
| 10,133,603 B2 | 11/2018 | Kendall | |
| 10,505,950 B2 * | 12/2019 | Sherkin | H04L 12/403 |
| 10,592,216 B1 | 3/2020 | Richardson et al. | |
| 10,637,142 B1 * | 4/2020 | Tran | H04W 4/44 |
| 11,082,211 B2 * | 8/2021 | McCarthy | H04L 9/0662 |
| 11,157,827 B2 * | 10/2021 | Sim | G06N 5/01 |
| 11,449,799 B1 * | 9/2022 | Arbajian | H04L 9/3247 |
| 11,468,357 B2 * | 10/2022 | Johnson | G06F 17/14 |

(Continued)

FOREIGN PATENT DOCUMENTS

WO   WO-2007/105352 A1   9/2007

*Primary Examiner* — Viral S Lakhia
(74) *Attorney, Agent, or Firm* — Foley & Lardner LLP

(57) ABSTRACT

A system and method for establishing secure communications based on combined capabilities of classical and quantum computers. A system can perform encrypting, responsive to a request for client data associated with a client device, the client data using a cryptographic key to generate an encrypted data packet, transmitting the encrypted data packet to a second classical computer simulating a quantum computer operation, the encrypted data packet causing the second classical computer to begin a decryption process on the encrypted data packet to recover a decrypted data packet determining an absence of a response from the second classical computer occurring within a predefined window of time, the response comprising the decrypted data packet and transmitting, responsive to the absence of the response, the encrypted data packet to a quantum computer, the encrypted data packet causing the quantum computer to decrypt the encrypted data packet to recover a decrypted data packet.

20 Claims, 9 Drawing Sheets

(56) References Cited

U.S. PATENT DOCUMENTS

| | | | |
|---|---|---|---|
| 11,663,513 B2* | 5/2023 | Cao | G06N 10/00 |
| | | | 706/62 |
| 11,676,058 B2* | 6/2023 | Morehead | G06F 1/08 |
| | | | 706/62 |
| 11,823,009 B1* | 11/2023 | Stapleton | G06F 15/16 |
| 11,838,410 B1* | 12/2023 | Ramanathan | H04L 9/0861 |
| 11,876,789 B2* | 1/2024 | Van Adrichem | H04L 9/3263 |
| 2002/0152191 A1 | 10/2002 | Hollenberg et al. | |
| 2009/0003591 A1 | 1/2009 | Murakami et al. | |
| 2016/0218867 A1 | 7/2016 | Nordholt et al. | |
| 2018/0241552 A1 | 8/2018 | Kurian | |
| 2022/0358393 A1* | 11/2022 | Anschuetz | G06N 10/00 |
| 2023/0162236 A1* | 5/2023 | Abu Elreich | G06Q 20/387 |
| | | | 705/14.11 |
| 2024/0089087 A1* | 3/2024 | Ragan | H04L 9/0819 |

* cited by examiner

400

```
receiving, by a classical computer via a network, a
request for client data associated with a client
device
402
```

↓

```
encrypting, by the classical computer responsive to
the request, the client data using a cryptographic
key to generate an encrypted data packet
404
```

↓

```
transmitting, by the classical computer via the
network, the encrypted data packet to a quantum
computer, the encrypted data packet causing the
quantum computer to decrypt the encrypted data
packet to recover a decrypted data packet
406
```

transmitting, via a network and by a classical computer to a quantum computer, a request for client data associated with a client device, the request causing the quantum computer to retrieve client data associated with the client device, generate a signed data packet by digitally signing the client data, and transmit the signed data packet to the classical computer
502

verifying, by the classical computer and based on the signed data packet, an authenticity of the signed data packet
504

FIG. 5

600 

```
computing, by the quantum computer, a coefficient
associated with the client data
602
```

```
generating, by the quantum computer and based on
the coefficient, an equation relating a plurality of
parameter values to a plurality of digital signatures
604
```

```
randomly selecting, by the quantum computer and
using the equation, a parameter value from the
plurality of parameter values
606
```

```
computing, by the quantum computer and using the
equation, a digital signature corresponding to the
selected parameter value
608
```

FIG. 6

700
receiving, by the classical computer, a second equation associated with the first equation, the signed data packet, and the selected parameter value
702
computing, by the classical computer and using the second equation, the digital signature corresponding to the selected parameter value
704
FIG. 7 ns which, when executed by the one or more processors, cause the one or more processors to encrypt, via a network and responsive to a request for client data associated with a client device, the client data using a cryptographic key to generate an encrypted data packet, transmit, via the network, the encrypted data packet to a second classical computer simulating a quantum computer operation, the encrypted data packet causing the second classical computer to begin a decryption process on the encrypted data packet to recover a decrypted data packet, determine an absence of a response from the second classical computer occurring within a predefined window of time, the response comprising the decrypted data packet, and transmit, via the network responsive to the absence of the response, the encrypted data packet to a quantum computer, the encrypted data packet causing the quantum computer to decrypt the encrypted data packet to recover a decrypted data packet.

QUANTUM AND CLASSICAL CRYPTOGRAPHY (QCC) FOR DATA ENCRYPTION AND DATA DECRYPTION

CROSS-REFERENCE TO RELATED PATENT APPLICATIONS

This application is a continuation of U.S. patent application Ser. No. 16/546,969, filed Aug. 21, 2019, the contents of such application being hereby incorporated by reference in its entirety.

BACKGROUND

Quantum computer researchers mostly work on proof-of-concepts, operating on "small" problems such that quantum computer simulators running on classical computers are still faster. However, current industry trends are that quantum computers will be become more reliable, mainstream, and faster than a classical computer. While a classical computer processes bits sequentially, the quantum bits or qubits processed by a quantum computer are entangled together, so changing the state of one qubit influences the state of others regardless of their physical distance. Furthermore, the superposition principle of quantum mechanics allows a qubit to simultaneously store more information than the classical "0" and "1". That is, two qubits can simultaneously hold four ($2^2$) values (e.g., 00, 01, 10, and 11). Thus, a "true" quantum computer that is able to implement both the entanglement and superposition principles can converge on the right answer to a difficult mathematical problem very quickly.

SUMMARY

Aspects of the present disclosure relate generally to quantum and classical cryptography, and more particularly to systems and methods for establishing secure communications over a network based on combined capabilities of classical and quantum computers.

Some arrangements disclosed herein are directed to a method for establishing secure communications over a network based on combined capabilities of classical and quantum computers. In some arrangements, the method includes encrypting, by a first classical computer via a network and responsive to a request for client data associated with a client device, the client data using a cryptographic key to generate an encrypted data packet, transmitting, by the first classical computer via the network, the encrypted data packet to a second classical computer simulating a quantum computer operation, the encrypted data packet causing the second classical computer to begin a decryption process on the encrypted data packet to recover a decrypted data packet, determining, by the first classical computer, an absence of a response from the second classical computer occurring within a predefined window of time, the response comprising the decrypted data packet, and transmitting, by the first classical computer via the network responsive to the absence of the response, the encrypted data packet to a quantum computer, the encrypted data packet causing the quantum computer to decrypt the encrypted data packet to recover a decrypted data packet.

In another aspect, the present disclosure is directed to a system for establishing secure communications over a network based on combined capabilities of classical and quantum computers. In some arrangements, the system includes one or more processors of a first classical computer, and one or more computer-readable storage mediums storing instruc- In another aspect, the present disclosure is directed to a non-transitory computer-readable storage medium storing instructions which, when executed by one or more processors, cause the one or more processors to perform operations including encrypting, by the first classical computer via a network and responsive to a request for client data associated with a client device, the client data using a cryptographic key to generate an encrypted data packet, transmitting, by the first classical computer via the network, the encrypted data packet to a second classical computer simulating a quantum computer operation, the encrypted data packet causing the second classical computer to begin a decryption process on the encrypted data packet to recover a decrypted data packet, determining, by the first classical computer, an absence of a response from the second classical computer occurring within a predefined window of time, the response comprising the decrypted data packet, and transmitting, by the first classical computer via the network responsive to the absence of the response, the encrypted data packet to a quantum computer, the encrypted data packet causing the quantum computer to decrypt the encrypted data packet to recover a decrypted data packet.

These and other features, together with the organization and manner of operation thereof, will become apparent from the following detailed description when taken in conjunction with the accompanying drawings.

BRIEF DESCRIPTION OF THE FIGURES

FIG. 4 is a flow diagram depicting a method for establishing secure communications over a network based on combined capabilities of classical and quantum computers, according to some arrangements.

FIG. 5 is a flow diagram depicting a method for establishing secure communications over a network based on combined capabilities of classical and quantum computers, according to some arrangements.

FIG. 6 is a flow diagram depicting a method for digitally signing a message, according to some arrangements.

FIG. 7 is a flow diagram depicting a method for verifying a digital signature of a message, according to some arrangements.

Like reference numbers and designations in the various drawings indicate like elements.

DETAILED DESCRIPTION

Figure 1A:
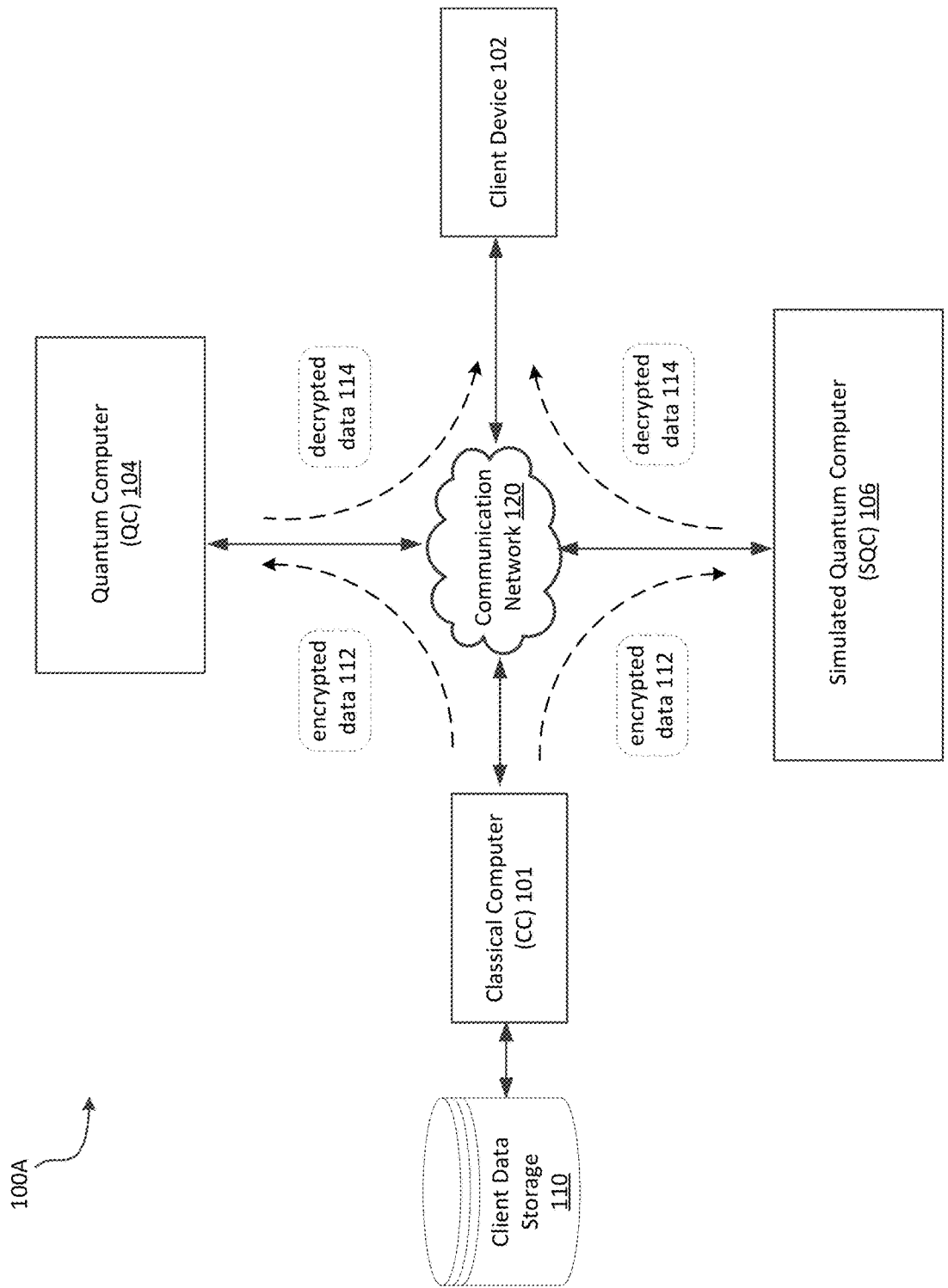
FIG. 1A is a block diagram depicting an example environment for establishing secure communications over a network based on combined capabilities of classical and quantum computers, according to some arrangements.

Modern cryptography typically occurs in pairs such as encrypt/decrypt or sign/verify where software, firmware or hardware functions are implemented on classical computers (i.e., a computer that processes information according to classical laws of physics). For example, a first classical computer may establish a secure connection with a second classical computer based on a pair of keys (e.g., one private and one public). The first classical computer would encrypt a message (e.g., client data) with the public key and the second classical computer would decrypt the message with the private key. The classical computers may also use the pair of keys to authenticate messages. The first classical computer would sign a message (e.g., client data) with the private key, and the second classical computer would verify the message using the public key. In both instances, the pair of keys are derived from asymmetric algorithms (e.g., Rivest-Shamir-Adleman (RSA), Diffie-Hellman (DH) and Elliptic Curve Cryptography (ECC)) that are based on "difficult" mathematical problems, such as integer factorization and discrete logarithms. Since these mathematical problems are computationally infeasible for a classical computer to solve within an amount of time that is practical for most applications (e.g., financial transactions, etc.), the classical computer is incapable of deriving the private key from the public key, which is a security feature of cryptographic functions (e.g., encrypt/decrypt and sign/verify).

However, the advent of quantum computers (QC) with cryptanalytic capabilities threatens many of these asymmetric algorithms. A quantum computer can rapidly solve integer factorization and discrete logarithmic problems to reveal the private key by using a quantum computer algorithm, such as Shor's algorithm. For example, the RSA public key is its modulus which is a product of two prime numbers, N=PQ, but factoring such large numbers is too "difficult" of a mathematical problem for classical computers to solve. On the other hand, a quantum computer running Shor's algorithm can rapidly find P or Q, which reveals the RSA private key, $D=(P-1)(Q-1)$.

The National Institute of Standards and Technology (NIST) is in the process of selecting public-key cryptographic algorithms through a public competition-like process, referred to as NIST Post-Quantum Cryptography (PQC) Standardization Process. The new public-key cryptography standards will specify one or more additional algorithms in each of digital signature, public-key encryption, and key-establishment. The new standards will augment Federal Information Processing Standard Publication (FIPS) 186-4, Digital Signature Standard (DSS), as well as Special Publications 800-56A Revision 3, Recommendation for Pair-Wise Key Establishment Schemes Using Discrete Logarithm Cryptography, and 800-56B, Recommendation for Pair-Wise Key-Establishment Schemes Using Integer Factorization [3]. The goal of PQC is to develop cryptographic systems that are secure against both quantum and classical computers. While the PQC now in development are QC-resistant cryptographic algorithms that can run on classical computers, the inevitable advances in quantum computer technology will likely make it possible for a quantum computer to solve virtually any cryptographic algorithm.

Accordingly, the present disclosure is directed to systems and methods for establishing secure communications over a network based on combined capabilities of classical and quantum computers. The present disclosure combines quantum computer capabilities with classical computers where one function (e.g., encryption) is performed on a classical computer, but the inverse function (e.g., decryption) is performed on a quantum computer. For example, given a message M and a random number R the product P=MR might be the encryption of M, where P is the ciphertext and M is the cleartext. The present disclosure explains how a quantum computer's capability to rapidly factor P into its unique product of prime numbers may be used to decrypt a message that was encrypted by a classical computer. The present disclosure also combines quantum computer capabilities with classical computers where signature generation is performed on a quantum computer, but signature verification is done on a classical computer.

In general, a cryptographic function (e.g., C) and its inverse (e.g., C') are performed on different systems where one function is performed on a quantum computer (QC) and the other is performed on a classical computer (CC). In the case of message encryption and message decryption, a classical computer (e.g., classical computer 101 (CC) in FIG. 1A; also referred to herein as, CC 101) receives via a network a request for client data associated with a client device (e.g., client device 102 in FIG. 1A). In response, CC 101 retrieves the client data from a client data storage 110 (e.g., client data storage 110 in FIG. 1A) and encrypts the retrieved client data using a cryptographic key (e.g., Rivest-Shamir-Adleman (RSA), Diffie-Hellman (DH) and Elliptic Curve Cryptography (ECC)) to generate an encrypted data packet (e.g., encrypted data 112 in FIG. 1A). The CC 101 also receives a resource parameter indicating an amount of available resources (e.g., computing processing units (CPU), memory space, hard disk space, etc.) associated with a simulated quantum computer (e.g., simulated quantum computer (SQC) 106 in FIG. 1A; also referred to herein as, SQC 106). The SQC 106 may be a classical computer executing a software application that simulates one or more quantum computer operations. The CC 101 determines a processing time associated with decrypting the encrypted data packet using the resource parameter and compares the processing time to a predetermined threshold value to quantify the capability of the SQC 106 to decrypt the encrypted data packet. A predetermined threshold value may be an integer or non-integer number indicating any amount of time having units of seconds (e.g., 0.003 s), minutes (e.g., 1 m), or hours (e.g., 2 h). If the processing time exceeds the predetermined threshold value, then CC 101 determines that the SQC 106 is incapable of decrypting the encrypted data, and in response, selects a quantum computer (e.g., quantum computer (QC) 104 in FIG. 1A; also referred to herein as, QC 104) to decrypt the encrypted data packet. If the processing time does not exceed the predetermined threshold value, then CC 101 determines that the SQC 106 is capable of decrypting the encrypted data, and in response, selects the SQC 106 to decrypt the encrypted data packet. The CC 101 transmits the encrypted data packet to the selected computer (e.g., QC 104 or SQC 106), which causes the selected computer to decrypt the encrypted data packet to recover a decrypted data packet (e.g., decrypted data 114 in FIG. 1A). The selected computer transmits the decrypted data packet to the client device 102. In some arrangements, the CC 101 selects the QC 104 to decrypt the encrypted data packet by default and without determining the capability of the SQC 106 to decrypt the encrypted data packet.

Figure 1B:
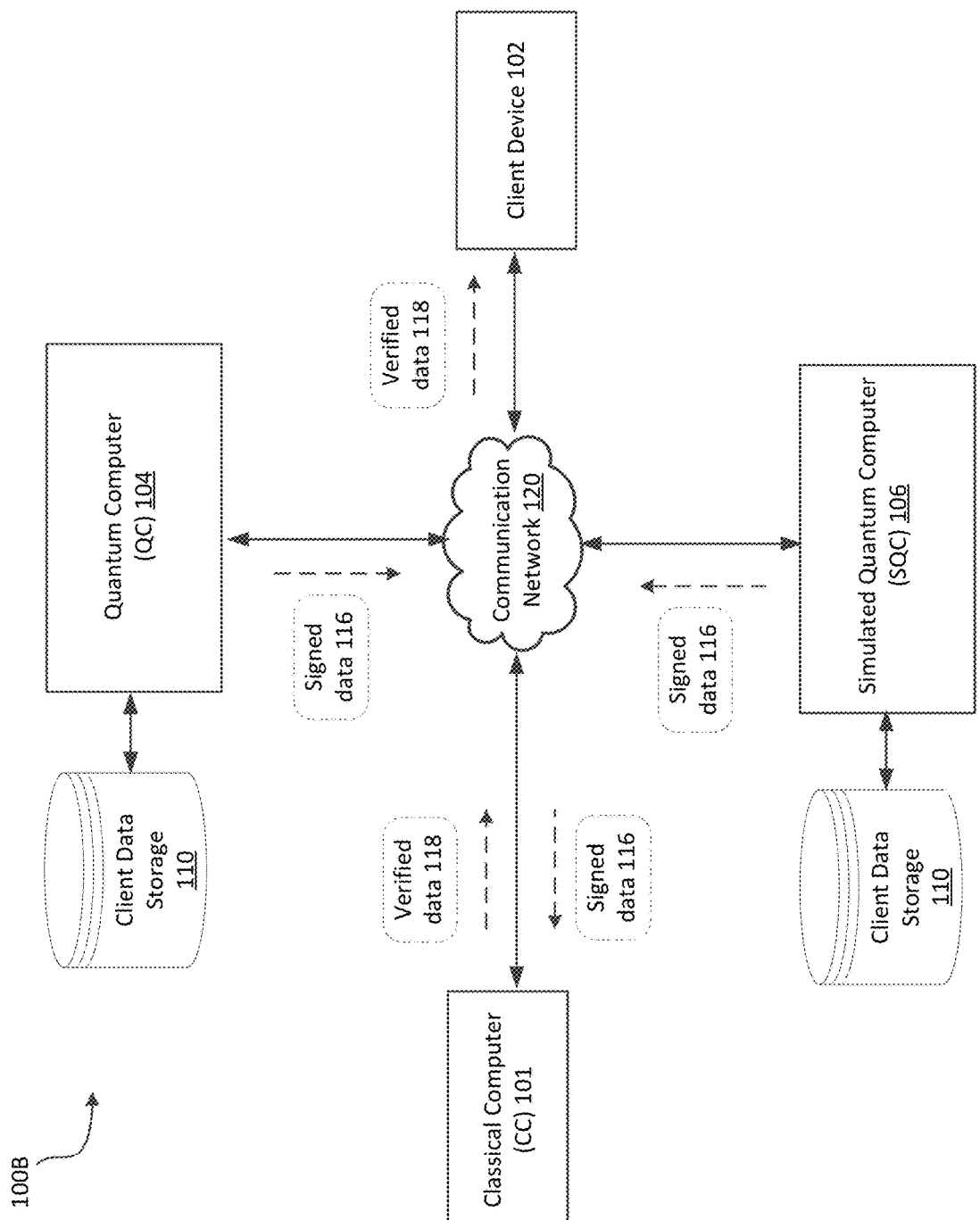
FIG. 1B is a block diagram depicting an example environment for establishing secure communications over a network based on combined capabilities of classical and quantum computers, according to some arrangements.

In the case of signature generation and signature verification, a classical computer (e.g., classical computer 101 (CC) in FIG. 1B; also referred to herein as, CC 101) receives a resource parameter indicating an amount of available resources (e.g., computing processing units (CPU), memory, hard disk space, etc.) associated with a simulated quantum computer (e.g., simulated quantum computer (SQC) 106 in FIG. 1B; also referred to herein as, SQC 106). The SQC 106 may be a classical computer executing a software application that simulates one or more quantum computer operations. The CC 101 determines a processing time associated with generating a signed data packet based on client data associated with a client device (e.g., client device 102 in FIG. 1B) using the resource parameter. The CC 101 compares the processing time to a predetermined threshold value to quantify the capability of the SQC 106 to generate the signed data packet. If the processing time exceeds the predetermined threshold value, then CC 101 determines that the SQC 106 is incapable of generating the signed data packet, and in response, selects a quantum computer (e.g., quantum computer (QC) 104 in FIG. 1B; also referred to herein as, QC 104) to generate the signed data packet. If the processing time does not exceed the predetermined threshold value, then CC 101 determines that the SQC 106 is capable of generating the signed data packet, and in response, selects the SQC 106 to generate the signed data packet. The CC 101 transmits via a network to the selected computer (e.g., QC 104 or SQC 106) a request for the client data. The request causes the selected computer to retrieve the client data from a client data storage (e.g., client data storage 110 in FIG. 1B), generate a signed data packet by digitally signing the client data, and transmit the signed data packet (e.g., signed data 116 in FIG. 1B) back to the CC 101. In response to receiving the signed data packet, the CC 101 verifies an authenticity of the signed data packet. The CC 101 transmits the verified data (e.g., verified data 118) to client device 102. In some arrangements, the CC 101 selects the QC 104 to generate the signed data packet by default and without determining the capability of the SQC 106 to generate the signed data packet.

FIG. 1A is a block diagram depicting an example environment for establishing secure communications over a network based on combined capabilities of classical and quantum computers, according to some arrangements. The environment 100A includes a CC 101, a QC 104, a SQC 106, and a client device 102 that are in communication one another via a communication network 120. The CC 101, QC 104, SQC 106, and client device 102 each include hardware elements, such as one or more processors, logic devices, or circuits. The environment 100A includes a client data storage 110 for storing client data associated with client device 102. In some arrangements, the client data storage 110 may store client data associated with any computing device in environment 100A, such as CC 101, QC 104, and SQC 106. The client data storage 110 may be communicably coupled to QC 104 and SQC 106 via the communication network 120 and/or any local network (not shown).

The CC 101 is an electronic computing device that is capable of receiving a request for client data, retrieving the client data from client data storage 110, encrypting the client data, and transmitting the encrypted client data (e.g., encrypted data 112 in FIG. 1A) to another computing device (e.g., QC 104 and SQC 106). The CC 101 may be any number of different types of electronic computing devices adapted to communicate over a communication network 120, including without limitation, a personal computer, a laptop computer, a desktop computer, a mobile computer, a tablet computer, a smart phone, an application server, a catalog server, a communications server, a computing server, a database server, a file server, a game server, a mail server, a media server, a proxy server, a virtual server, a web server, or any other type and form of computing device or combinations of devices.

The client device 102 is an electronic computing device that is capable of sending a request for client data to QC 104 and/or SQC 106 and receiving decrypted data (e.g., decrypted data 114 in FIG. 1A) from QC 104 and/or SQC 106. The client device 102 may be any number of different types of electronic computing devices, as discussed herein.

The QC 104 is a quantum computing device that is capable of receiving an encrypted data packet from CC 101, decrypting the encrypted data packet to recover a decrypted data packet, and transmitting the decrypted data packet (e.g., decrypted data 114 in FIG. 1A) to client device 102. The QC 104 may be any number of different types of quantum computing device, including without limitation, a superconducting quantum computer, a trapped ion quantum computer, an optical lattice based quantum computer, a quantum dot computer (spin-based or spatial-based), coupled quantum wire, a nuclear magnetic resonance quantum computer (NMRQC), a solid-state nuclear magnetic resonance (NMR) Kane quantum computer, an electrons-on-helium quantum computer, a cavity quantum electrodynamics (CQED) based quantum computer, a molecular magnet-based quantum computer, a fullerene-based electronic spin resonance (ESR) quantum computer, a linear optical quantum computer, a diamond-based quantum computer, a Bose-Einstein condensate-based quantum computer, a transistor-based quantum computer, a rare-earth-metal-ion-doped inorganic crystal based quantum computer, a metallic-like carbon nanospheres based quantum computers, or any other type and form of quantum computing device or combinations of devices.

The SQC 106 is an electronic computing device that is capable of receiving an encrypted data packet from CC 101, decrypting the encrypted data packet to recover a decrypted data packet, and transmitting the decrypted data packet (e.g., decrypted data 114 in FIG. 1A) to client device 102. The SQC 106 executes an application that simulates one or more quantum computing operations capable of being performed by a quantum computing device, such as QC 104. In some arrangements, SQC 106 processes information and/or performs operations (e.g., decrypting data, digitally signing data, etc.) at a rate that is slower than the rate at which QC 104 performs the same or similar operations due to the differences in performance between conventional processors (e.g., processor 203C in FIG. 2C) configured to process logical bits and quantum logic gates (e.g., quantum processor 203B in FIG. 2B) configured to process quantum bits or qubits.

The communication network 120, (e.g., a local area network (LAN), wide area network (WAN), the Internet, or a combination of these or other networks) connects any electronic computing device (e.g., CC 101, client device 102, SQC 106) and quantum computing device (e.g., QC 104) with one or more electronic devices, databases (e.g., client data storage 110), and/or quantum computing devices (e.g., QC 104). The environment 100B may include many thousands of classical computers 101, quantum computers 104, simulated quantum computers 106, and client devices 102 interconnected in any arrangement to facilitate the exchange of data between such computing devices.

Although not illustrated, in many arrangements, the communication network 120 may comprise one or more intermediary devices, including gateways, routers, firewalls, switches, network accelerators, Wi-Fi access points or hotspots, or other devices. Any of the electronic devices and/or the communication network 120 may be configured to support any application layer protocol, including without limitation, Transport Layer Security (TLS), Hypertext Transfer Protocol (HTTP), and Hypertext Transfer Protocol Secure (HTTPS).

FIG. 1B is a block diagram depicting an example environment for establishing secure communications over a network based on combined capabilities of classical and quantum computers, according to some arrangements. The environment 100B includes a CC 101, a QC 104, a SQC 106, and a client device 102 that are in communication one another via a communication network 120. The environment 100B includes a client data storage 110 for storing client data associated with client device 102. In some arrangements, the client data storage 110 may store client data associated with any computing device in environment 100B, such as CC 101, QC 104, and SQC 106. The client data storage 110 may be communicably coupled to QC 104 and SQC 106 via the communication network 120 and/or any local network (not shown).

The CC 101 is an electronic device that is capable of transmitting a request for client data to another computing device (e.g., QC 104 or SQC 106), receiving a signed data packet (e.g., signed data 116 in FIG. 1B) from the computing device, and verifying an authenticity of the signed data packet. In some arrangements, the CC 101 transmits verified data (e.g., verified data 118) to a client device 102. The CC 101 may be any number of different types of electronic devices, as discussed herein.

The client device 102 is an electronic device that is capable of sending a request for client data to QC 104 and/or SQC 106 and receiving verified data (e.g., verified data 118 in FIG. 1B) from QC 104 and/or SQC 106. The client device 102 may be any number of different types of electronic devices, as discussed herein.

The QC 104 is a quantum computing device that is capable of receiving a request for client data, retrieving the client data from a data storage (e.g., client data storage 110 in FIG. 1B), digitally signing the client data to generate signed data packet (e.g., signed data 116 in FIG. 1B), and transmitting the signed data packet to CC 101. The QC 104 may be any number of different types of quantum computing device, as discussed herein.

The SQC 106 is an electronic device that is capable of receiving a request for client data, retrieving the client data from a data storage (e.g., client data storage 110 in FIG. 1B), digitally signing the client data to generate signed data packet (e.g., signed data 116 in FIG. 1B), and transmitting the signed data packet to CC 101. As discussed herein, SQC 106 executes an application that simulates one or more quantum computing operations capable of being performed by a quantum computing device, such as QC 104.

Figure 2A:
FIG. 2A is a block diagram depicting an example classical computer of the environments in FIG. 1A and FIG. 1B, according to some arrangements.

FIG. 2A is a block diagram depicting an example classical computer of the environments in FIG. 1A and FIG. 1B, according to some arrangements. While various circuits, interfaces, and logic with particular functionality are shown, it should be understood that classical computer (CC) 101 (also referred to herein as, CC 101) includes any number of circuits, interfaces, and logic for facilitating the functions described herein. For example, the activities of multiple circuits may be combined as a single circuit and implemented on a same processing circuit (e.g., processing circuit 202A), as additional circuits with additional functionality are included.

The CC 101 includes a processing circuit 202A composed of one or more processors 203A and a memory 204A. A processor 203A may be implemented as a general-purpose processor, a microprocessor, an Application Specific Integrated Circuit (ASIC), one or more Field Programmable Gate Arrays (FPGAs), a Digital Signal Processor (DSP), a group of processing components, or other suitable electronic processing components. In many arrangements, processor 203A may be a multi-core processor or an array (e.g., one or more) of processors. The processor 203A may be configured to perform classical computations on a bit, which is a binary unit of information equating to one of two possible values (e.g., a '0' or a '1').

The memory 204A (e.g., Random Access Memory (RAM), Read-Only Memory (ROM), Non-volatile RAM (NVRAM), Flash Memory, hard disk storage, optical media, etc.) of processing circuit 202A stores data and/or computer instructions/code for facilitating at least some of the various processes described herein. The memory 204A includes tangible, non-transient volatile memory, or non-volatile memory. The memory 204A stores programming logic (e.g., instructions/code) that, when executed by the processor 203A, controls the operations of the CC 101. In some arrangements, the processor 203A and the memory 204A form various processing circuits described with respect to the CC 101. The instructions include code from any suitable computer programming language such as, but not limited to, C, C++, C#, Java, JavaScript, VBScript, Perl, HTML, XML, Python, TCL, and Basic. In some arrangements (referred to as "headless servers"), the CC 101 may omit the input/output circuit, but may communicate with a computing device via network interface 206A.

The CC 101 includes a network interface 206A configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some arrangements, the CC 101 includes a plurality of network interfaces 206A of different types, allowing for connections to a variety of networks, such as local area networks or wide area networks including the Internet, via different sub-networks.

The CC 101 includes an input/output circuit 205A configured to receive user input from and provide information to a user. In this regard, the input/output circuit 205A is structured to exchange data, communications, instructions, etc. with an input/output component of the CC 101. Accordingly, input/output circuit 205A may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of CC 101, such as a built-in display, touch screen, microphone, etc., or external to the housing of CC 101, such as a monitor connected to CC 101, a speaker connected to CC 101, etc., according to various arrangements. In some arrangements, the input/output circuit 205A includes communication circuitry for facilitating the exchange of data, values, messages, and the like between the input/output device and the components of the CC 101. In some arrangements, the input/output circuit 205A includes machine-readable media for facilitating the exchange of information between the input/output device and the components of the CC 101. In still another arrangement, the input/output circuit 205A includes any combination of hardware components (e.g., a touchscreen), communication circuitry, and machine-readable media.

The CC 101 includes a device identification circuit 207A (shown in FIG. 2A as device ID circuit 207A) configured to generate and/or manage a device identifier associated with CC 101. The device identifier may include any type and form of identification used to distinguish the CC 101 from other computing devices. In some arrangements, a device identifier may be associated with one or more other device identifiers. In some arrangements, to preserve privacy, the device identifier may be cryptographically generated, encrypted, or otherwise obfuscated by any circuit of CC 101. In some arrangements, the CC 101 may include the device identifier in any communication (e.g., a request, encrypted data 112, etc.) that the CC 101 sends to a computing device.

The CC 101 includes an encryption circuit 222A that may be configured to receive via communication network 120 a request for client data associated with a client device (e.g., client device 102, CC 101, etc.) In some arrangements, the request may include an identifier (e.g., a device identifier) that identifies a client device (e.g., client device 102) and/or a user associated with a client device. In some arrangements, the identifier may identify CC 101 as the client device instead of client device 102. In some arrangements the request may include a predetermined threshold value indicating the amount of time that a client device (e.g., client device 102) or CC 101 is willing to wait for a computing device (e.g., QC 104, SQC 106) to generate decrypted data (e.g., decrypted data 114). In some arrangements, the encryption circuit 222A may be configured to retrieve the client data from client data storage 110. In some arrangements, the encryption circuit 222A may be configured to retrieve the client data from the client data storage 110 by searching the client data storage 110 for client data associated with a device identifier that is associated with the client device.

The encryption circuit 222A may be configured to encrypt, responsive to the request, the client data using a cryptographic key (e.g., cryptographic key comprising a Rivest-Shamir-Adleman (RSA) algorithm, a Diffie-Hellman (DH) algorithm, or an Elliptic Curve Cryptography (ECC) algorithm) to generate an encrypted data packet. In some arrangements, the encryption circuit 222A may be configured to receive a resource parameter indicating an amount of available resources associated with a second computer (e.g., SQC 106, QC 104). In some arrangements, the encryption circuit 222A may transmit a request to the second computer for access to the resource parameter associated with a second computer, which causes the second computer to send the resource parameter to the encryption circuit 222A.

The encryption circuit 222A may be configured to determine a processing time associated with decrypting the encrypted data packet using the resource parameter. In some arrangements, the encryption circuit 222A may be configured to compare the processing time to a predetermined threshold value to determine whether the processing time exceeds the predetermined threshold value. In some arrangements, the encryption circuit 222A may be configured to select, responsive to determining that the processing time exceeds the predetermined threshold value, the quantum computer to decrypt the encrypted data packet.

The encryption circuit 222A may be configured to transmit, via a network, the encrypted data packet to the selected computer (e.g., QC 104 or SQC 106). In some arrangements, the encrypted data packet causes the selected computer to decrypt the encrypted data packet to recover a decrypted data packet. In some arrangements, the encrypted data packet causes the selected computer to decrypt the encrypted data packet using a quantum computer algorithm (e.g., Shor's algorithm). In some arrangements, the encrypted data packet causes the selected computer to transmit the decrypted data packet to a computing device (e.g., client device 102, CC 101).

In some arrangements, the encryption circuit 222A may be configured to transmit, via a network, the encrypted data packet to a second classical computer (e.g., SQC 106) executing an application that simulates a quantum computer operation. In some arrangements, the encrypted data packet causes the second computer to begin a decryption process on the encrypted data packet to recover a decrypted data packet for returning to the one or more processors. In some arrangements, the encryption circuit 222A may determine an absence of a response (e.g., a response that includes the decrypted data packet) from the second classical computer occurring within a predefined window of time. In response to determining that the second classical computer failed to recover and return the decrypted data packet to the encryption circuit 222A within the predefined window of time, the encryption circuit 222A transmits, via the network, the encrypted data packet to the quantum computer. In some arrangements, the encrypted data packet causes the quantum computer to decrypt the encrypted data packet to recover a decrypted data packet. In some arrangements, in response to determining that the second classical computer failed to recover and return the decrypted data packet to the encryption circuit 222A within the predefined window of time, the encryption circuit 222A transmits a cancelation message to the second classical computer causing the second computer to cancel the decryption process on the encrypted data packet.

The CC 101 includes a verification circuit 220A that may be configured to receive a resource parameter indicating an amount of available resources associated with SQC 106. In some arrangements, the verification circuit 220A may transmit a request to SQC 106 for access to the resource parameter associated with SQC 106, which causes the SQC 106 to send the resource parameter to the verification circuit 220A.

The verification circuit 220A may be configured to determine a processing time associated with generating a signed data packet based on client data associated with a client device using the resource parameter. The verification circuit 220A may be configured to compare the processing time to a predetermined threshold value to quantify the capability of SQC 106 to generate the signed data packet. If the processing time exceeds the predetermined threshold value, then CC 101 determines that the SQC 106 is incapable of generating the signed data packet, and in response, selects a quantum computer (e.g., QC 104) to generate the signed data packet. If the processing time does not exceed the predetermined threshold value, then the verification circuit 220A determines that the SQC 106 is capable of generating the signed data packet, and in response, selects the SQC 106 to generate the signed data packet.

The verification circuit 220A may be configured to transmit via a network to the selected computer (e.g., QC 104 or SQC 106) a request for the client data. In some arrangements the request may include a predetermined threshold value indicating the amount of time that a client device (e.g., client device 102) or CC 101 is willing to wait for a computing device (e.g., QC 104, SQC 106) to generate signed data (e.g., signed data 116). The verification circuit 220A may generate and transmit a request to the selected computer that causes the selected computer to retrieve the client data from a client data storage (e.g., client data storage 110 in FIG. 1B), generate a signed data packet by digitally signing the client data, and/or transmit the signed data packet (e.g., signed data 116 in FIG. 1B) back to the CC 101. In response to receiving the signed data packet, the verification circuit 220A verifies an authenticity of the signed data packet. In some arrangements, the verification circuit 220A transmits the verified data (e.g., verified data 118 in FIG. 1B) to client device 102 responsive to determining that the client data and/or signature is authentic.

In some arrangements, the verification circuit 220A may be configured to transmit, via a network, the request (as discussed herein) to a second classical computer (e.g., SQC 106) executing an application that simulates a quantum computer operation. In some arrangements, the request causes the second classical computer to retrieve the client data from a client data storage (e.g., client data storage 110 in FIG. 1B) and begin a digital signing process on the client data to generate a signed data packet for returning the signed data packet back to verification circuit 220A. In some arrangements, the verification circuit 220A may determine an absence of a response (e.g., a response that includes the signed data packet) from the second classical computer occurring within a predefined window of time. In response to determining that the second classical computer failed to generate the signed data packet and return the signed data packet to the verification circuit 220A within the predefined window of time, the verification circuit 220A transmits, via the network, a second request to the quantum computer for client data. In some arrangements, the second request causes the quantum computer to retrieve the client data from a client data storage (e.g., client data storage 110 in FIG. 1B), generate a signed data packet by digitally signing the client data, and/or transmit the signed data packet (e.g., signed data 116 in FIG. 1B) back to the CC 101. In some arrangements, in response to determining that the second classical computer failed to return the signed data packet to the verification circuit 220A within the predefined window of time, the verification circuit 220A transmits a cancelation message to the second classical computer causing the second computer to cancel the signing process on the client data.

The CC 101 includes (or executes) an application 270A that is communicably coupled to communication network 120 allowing the CC 101 to send/receive data (e.g., requests, client data, encrypted data 112, decrypted data 114, a resource parameter, etc.) to any other computing devices connected to the communication network 120. The application 270A may be an internet/web browser, a graphic user interface (GUI), an email reader/client, a File Transfer Protocol (FTP) client, a virtual machine application, or a banking client application independent from an internet/web browser.

The application 270A includes a collection agent 215A. The collection agent 215A may include an application plug-in, application extension, subroutine, browser toolbar, daemon, or other executable logic for collecting data processed by the application 270A and/or monitoring interactions of user with the input/output circuit 205A. In other arrangements, the collection agent 215A may be a separate application, service, daemon, routine, or other executable logic separate from the application 270A but configured for intercepting and/or collecting data processed by application 270A, such as a screen scraper, packet interceptor, application programming interface (API) hooking process, or other such application. The collection agent 215A is configured for intercepting or receiving data input via the input/output circuit 205A, including mouse clicks, scroll wheel movements, gestures such as swipes, pinches, or touches, or any other such interactions; as well as data received and processed by the application 270A. The collection agent 215A, may begin intercepting/gathering/receiving data input via its respective input/output circuit based on any triggering event, including, e.g., a power-up of CC 101 or a launch of any software application executing on a processor of CC 101.

The CC 101 includes a bus (not shown), such as an address/data bus or other communication mechanism for communicating information, which interconnects circuits and/or subsystems, such as processing circuit 202A, network interface 206A, input/output circuit 205A, device ID circuit 207A, encryption circuit 222A, and verification circuit 220A, or any other circuits and/or subsystems of the CC 101. In some arrangements, the CC 101 may include one or more of any such circuits and/or subsystems.

In some arrangements, some or all of the circuits of the CC 101 may be implemented with the processing circuit 202A. For example, the encryption circuit 222A and/or verification circuit 220A may be implemented as a software application stored within the memory 204A and executed by the processor 203A. Accordingly, such arrangement can be implemented with minimal or no additional hardware costs. In some arrangements, any of these above-recited circuits rely on dedicated hardware specifically configured for performing operations of the circuit.

Figure 2C:
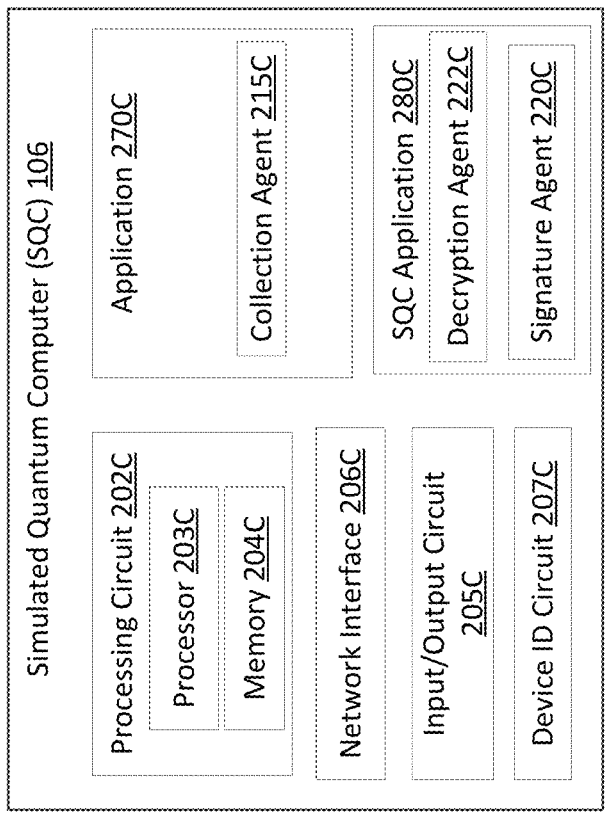
FIG. 2C is a block diagram depicting an example simulated quantum computer of the environments in FIG. 1A and FIG. 1B, according to some arrangements.
Figure 2B:
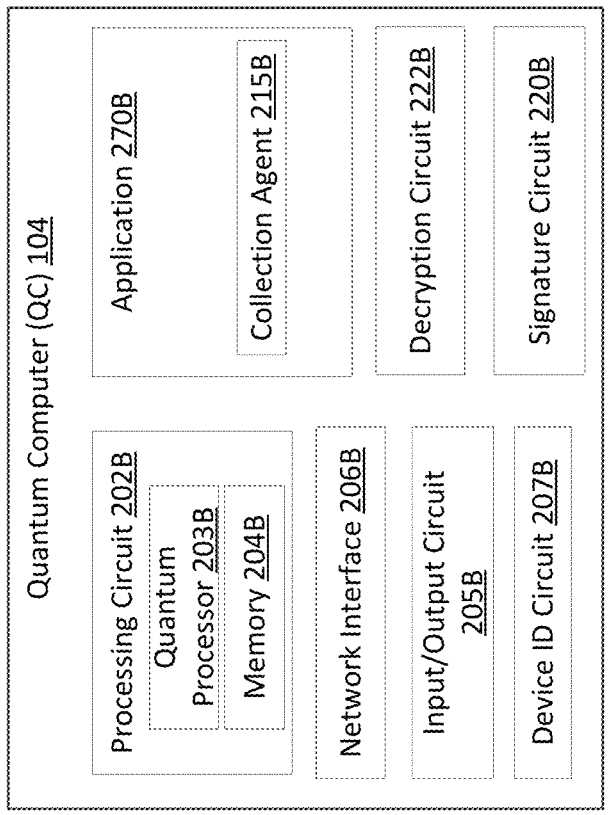
FIG. 2B is a block diagram depicting an example quantum computer of the environments in FIG. 1A and FIG. 1B, according to some arrangements.

FIG. 2B is a block diagram depicting an example quantum computer of the environments in FIG. 1A and FIG. 1B, according to some arrangements. While various circuits, interfaces, and logic with particular functionality are shown, it should be understood that quantum computer (QC) 104 (also referred to herein as, QC 104) includes any number of circuits, interfaces, and logic for facilitating the functions described herein. For example, the activities of multiple circuits may be combined as a single circuit and implemented on a same processing circuit (e.g., processing circuit 202B), as additional circuits with additional functionality are included.

The QC 104 includes a processing circuit 202B composed of one or more quantum processors 203B and a memory 204B. A quantum processor 203B may be implemented as one or more quantum logic gates or any other suitable electronic processing component configured to perform quantum computations using quantum bits or qubits. The quantum processor 203B solves mathematical problems (e.g., integer factorization and discrete logarithms) by performing one or more quantum algorithms including, without limitation, algorithms based on quantum Fourier transform (e.g., Deutsch-Jozsa algorithm, Bernstein-Vazirani algorithm, Simon's algorithm, Quantum phase estimation algorithm, Shor's algorithm, Hidden subgroup problem, Boson sampling problem, Estimating Gauss sums, Fourier fishing and Fourier checking), algorithms based on amplitude amplification (e.g., Grover's algorithm, Quantum counting), algorithms based on quantum walks (e.g., element distinctness problem, triangle-finding problem, formula evaluation, group commutativity), and hybrid quantum/classical algorithms (e.g., quantum approximate optimization algorithm (QAOA), variational quantum Eigensolver).

The memory 204B of processing circuit 202B stores data and/or computer instructions/code for facilitating at least some of the various processes described herein. The memory 204B is configured to maintain a sequence of qubits representing a one, a zero, or any quantum superposition of those two qubit states. In general, a memory 204B configured to maintain n qubits can be in any superposition of up to $2^n$ different states. For example, a pair of qubits can be in any quantum superposition of 4 states and three qubits in any superposition of 8 states. Conversely, a classical computer (e.g., CC 101 in FIG. 1A), may only be in one of these $2^n$ states at any one time.

The QC 104 includes a network interface 206B configured to establish a communication session with a computing device for sending and receiving data over the communication network 120 to the computing device. Accordingly, the network interface 206B includes identical or nearly identical functionality as network interface 206A in FIG. 2A, but with respect to circuits and/or subsystems of QC 104 instead of circuits and/or subsystems of CC 101.

The QC 104 includes an input/output circuit 205B configured to receive user input from and provide information to a user. In this regard, the input/output circuit 205B is structured to exchange data, communications, instructions, etc. with an input/output component of the QC 104. The input/output circuit 205B includes identical or nearly identical functionality as input/output circuit 205B, but with respect to circuits and/or subsystems of QC 104 instead of circuits and/or subsystems of CC 101.

The QC 104 includes a device identification circuit 20BA (shown in FIG. 2B as device ID circuit 207B) configured to generate and/or manage a device identifier associated with QC 104. The device identifier may include any type and form of identification used to distinguish the QC 104 from other computing devices. In some arrangements, a device identifier may be associated with one or more other device identifiers. In some arrangements, to preserve privacy, the device identifier may be cryptographically generated, encrypted, or otherwise obfuscated by any circuit of QC 104. In some arrangements, the QC 104 may include the device identifier in any communication (e.g., a request, decrypted data 114, etc.) that the QC 104 sends to a computing device.

The QC 104 includes a decryption circuit 222B that may be configured to receive a request from CC 101 for access to a resource parameter associated with QC 104. In response to receiving the request, QC 104 may retrieve the resource parameter from a data storage location (e.g., memory 204B, a registry, etc.) and transmit the resource parameter to CC 101.

The decryption circuit 222B may be configured to receive, via a network, an encrypted data packet (e.g., encrypted data 112 in FIG. 1A) from CC 101. In response to receiving the encrypted data packet, the decryption circuit 222B may decrypt the encrypted data packet to recover a decrypted data packet. In some arrangements, the decryption circuit 222B may decrypt the encrypted data packet using a quantum computer algorithm, as discussed herein. In response to receiving the encrypted data packet, the decryption circuit 222B may transmit the decrypted data packet (e.g., decrypted data 114 in FIG. 1A) to a computing device (e.g., client device 102, CC 101).

The QC 104 includes a signature circuit 220B that may be configured to send a resource parameter indicating an amount of available resources (e.g., computing processing units (CPU), memory space, hard disk space, etc.) associated with QC 104. In some arrangements, the signature circuit 220B may receive a request for access to the resource parameter associated with QC 104. In response, the QC 104 may send the resource parameter to CC 101.

The signature circuit 220B may be configured to receive via a network a request for the client data. In response, the signature circuit 220B may retrieve the client data from a client data storage (e.g., client data storage 110 in FIG. 1B), generate a signed data packet by digitally signing the client data, and/or transmit the signed data packet (e.g., signed data 116 in FIG. 1B) to the CC 101.

The signature circuit 220B may be configured to generate a signed data packet based on an equation. For example, the signature circuit 220B may be configured to compute (e.g., calculate, determine, etc.) a coefficient associated with a message (e.g., client data). The signature circuit 220B may further be configured to generate, based on the coefficient, an equation relating a plurality of parameter values to a plurality of digital signatures. The signature circuit 220B may further be configured to randomly select, using the equation, a parameter value from the plurality of parameter values. The signature circuit 220B may further be configured to compute, using the equation, a digital signature corresponding to the selected parameter value.

The QC 104 includes (or executes) an application 270B that is communicably coupled to communication network 120 allowing the QC 104 to send/receive data (e.g., requests, client data, signed data 116, verified data 118, a resource parameter, etc.) to any other computing devices connected to the communication network 120. The application 270B may be an internet/web browser, a graphic user interface (GUI), an email reader/client, a File Transfer Protocol (FTP) client, a virtual machine application, or a banking client application independent from an internet/web browser.

The application 270B includes a collection agent 215B. The collection agent 215B includes identical or nearly identical functionality as collection agent 215A in FIG. 2A, but with respect to circuits and/or subsystems of QC 104 instead of circuits and/or subsystems of CC 101.

The QC 104 includes a bus (not shown), such as an address/data bus or other communication mechanism for communicating information, which interconnects circuits and/or subsystems, such as processing circuit 202B, network interface 206B, input/output circuit 205B, device ID circuit 207B, decryption circuit 222B, and signature circuit 220B, or any other circuits and/or subsystems of the QC 104. In some arrangements, the QC 104 may include one or more of any such circuits and/or subsystems.

In some arrangements, some or all of the circuits of the QC 104 may be implemented with the processing circuit 202B. For example, the decryption circuit 222B and/or signature circuit 220B may be implemented as a software application stored within the memory 204B and executed by the quantum processor 203B. Accordingly, such arrangement can be implemented with minimal or no additional hardware costs. In some arrangements, any of these above-recited circuits rely on dedicated hardware specifically configured for performing operations of the circuit.

FIG. 2C is a block diagram depicting an example simulated quantum computer of the environments in FIG. 1A and FIG. 1B, according to some arrangements. While various circuits, interfaces, and logic with particular functionality are shown, it should be understood that simulated quantum computer (SQC) 106 (also referred to herein as, SQC 106) includes any number of circuits, interfaces, and logic for facilitating the functions described herein. For example, the activities of multiple circuits may be combined as a single circuit and implemented on a same processing circuit (e.g., processing circuit 202C), as additional circuits with additional functionality are included. In some arrangements, SQC 106 is a classical computer, such as CC 101 in FIG. 1A.

The SQC 106 includes a processing circuit 202C composed of one or more processors 203C and a memory 204C. The processor 203A includes identical or nearly identical functionality as processor 203A in FIG. 2A, but with respect to circuits and/or subsystems of SQC 106 instead of circuits and/or subsystems of CC 101. That is, the processor 203C may be configured to perform classical computations on a bit.

The memory 204C of processing circuit 202C stores data and/or computer instructions/code for facilitating at least some of the various processes described herein. The memory 203C includes identical or nearly identical functionality as memory 203A in FIG. 2A, but with respect to circuits and/or subsystems of SQC 106 instead of circuits and/or subsystems of CC 101.

The SQC 106 includes a network interface 206C configured to establish a communication session with a computing device for sending and receiving data over the communication network 120 to the computing device. The network interface 206C includes identical or nearly identical functionality as network interface 206A in FIG. 2A, but with respect to circuits and/or subsystems of SQC 106 instead of circuits and/or subsystems of CC 101.

The SQC 106 includes an input/output circuit 205C configured to receive user input from and provide information to a user. The input/output circuit 205C includes identical or nearly identical functionality as input/output circuit 205A in FIG. 2A, but with respect to circuits and/or subsystems of SQC 106 instead of circuits and/or subsystems of CC 101.

The SQC 106 includes a device identification circuit 207C (shown in FIG. 2C as device ID circuit 207C) configured to generate and/or manage a device identifier associated with SQC 106. The device identification circuit 207C includes identical or nearly identical functionality as device identification circuit 207C in FIG. 2C, but with respect to circuits and/or subsystems of SQC 106 instead of circuits and/or subsystems of CC 101.

The SQC 106 includes (or executes) an application 270C that is communicably coupled to communication network 120 allowing the SQC 106 to send/receive data (e.g., requests, client data, signed data 116, verified data 118, a resource parameter, etc.) to any other computing devices connected to the communication network 120. The application 270C may be an internet/web browser, a graphic user interface (GUI), an email reader/client, a File Transfer Protocol (FTP) client, a virtual machine application, or a banking client application independent from an internet/web browser.

The SQC 106 includes (or executes) an SQC application 280C that is communicably coupled to communication network 120 allowing the SQC 106 to send/receive data (e.g., requests, client data, signed data 116, verified data 118, a resource parameter, etc.) to any other computing devices connected to the communication network 120.

The SQC application 280C includes a decryption agent 222C and a signature agent 220C. The decryption agent 222C includes identical or nearly identical functionality as decryption circuit 222B in FIG. 2B, but with respect to circuits and/or subsystems of SQC 106 instead of circuits and/or subsystems of QC 104. The signature agent 220C includes identical or nearly identical functionality as signature circuit 220B in FIG. 2B, but with respect to circuits and/or subsystems of SQC 106 instead of circuits and/or subsystems of QC 104. While the SQC application 280C executes on a processor (e.g., processor 203C) that processes bits, the SQC application 280C (and its agents) simulates one or more operations performed by a quantum computer (e.g., QC 104). In some arrangements, the SQC application 280C (and its agents) simulates one or more operations performed by a quantum computer (e.g., QC 104) by simulating how a quantum processor (e.g., quantum processor 203B) processes quantum bits or qubits to perform quantum computations.

Figure 3:
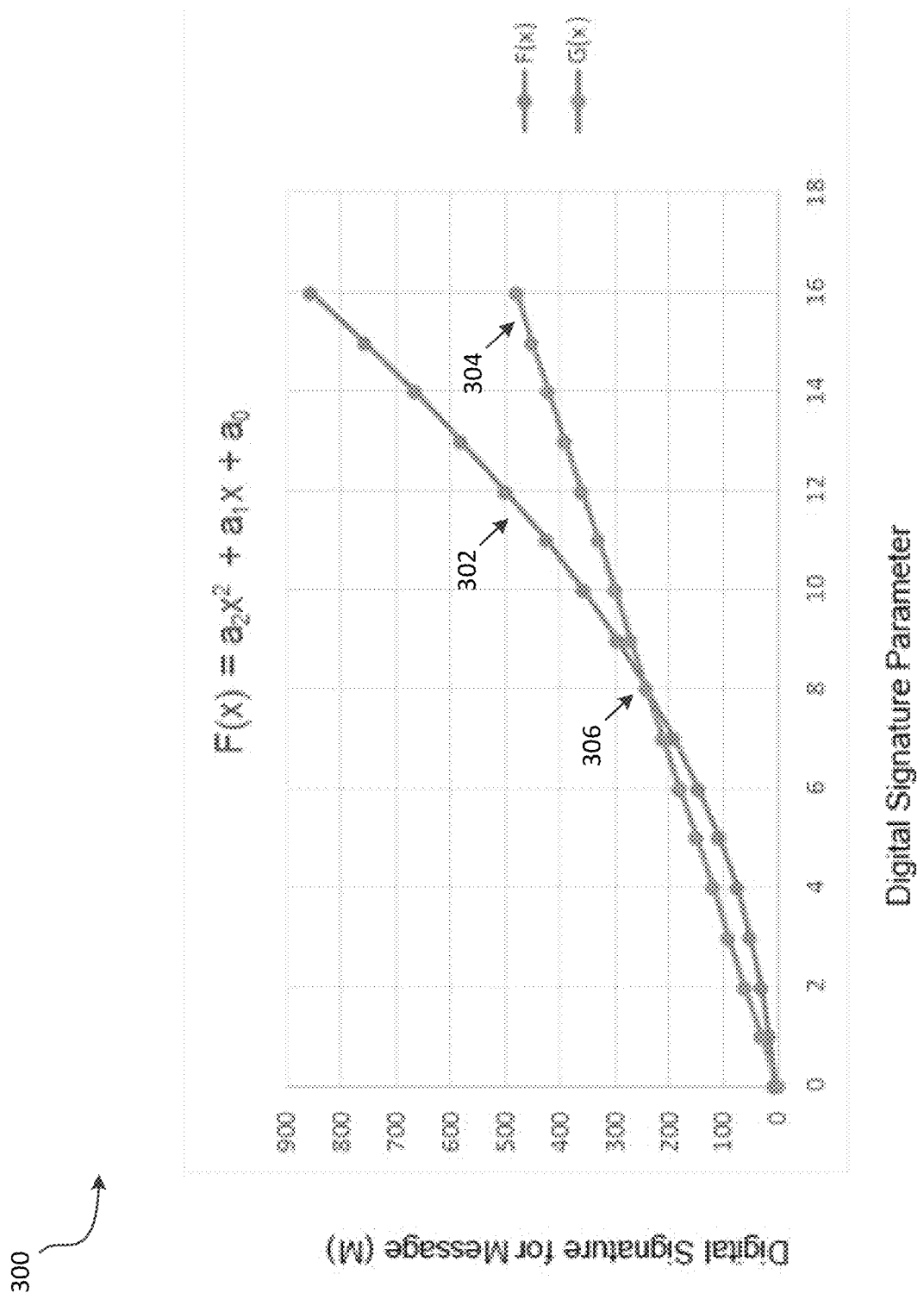
FIG. 3 is a graph depicting two equations for verifying an authenticity of a signed data packet, according to some arrangements.

FIG. 3 is a graph depicting two equations for verifying an authenticity of a signed data packet, according to some arrangements. The x-axis of graph 300 corresponds to a digital signature parameter and the y-axis of graph 300 corresponds to a digital signature of a message (M). The graph 300 includes line 302 representing equation F(x) and line 304 representing equation G (x). The line 302 and line 304 intercept at interception point 306 which corresponds to (8, 239) on graph 300. As shown in FIG. 3 in a non-limiting example, F(x) equates to the following polynomial:

$$F(x)=a_2x^2+a_1+a_0 \quad (1)$$

where $M=a_2*a_1+a_0$.

A quantum algorithm (e.g., Shor's algorithm, etc.) allows a quantum computer (e.g., QC 104) or a simulated quantum computer (e.g., SQC 106) to factor large numbers. This quantum computer capability may be used for signature verification on a quantum computer (e.g., QC 104) or a simulated quantum computer (e.g., SQC 106), while signature verification may be performed on a classical computer (e.g., CC 101). For example, given some message M that is not a prime number, it can be factored by a quantum computer into its unique product of prime numbers. These primes can be used by a quantum computer to create a polynomial such as $F(x)=a_2x^2+a_1x+a_0$, where $M=a_2*a_1*a_0$ is the product of the three coefficients. A random X may be chosen by a quantum computer such that its corresponding Y value is the message M signature, where (X,Y) is a point on the polynomial curve. Referring to FIG. 3, F(x) is shown for $a_2=3$, $a_1=5$, and $a_0=7$ and the point (8, 239) is shown. Hence, the message (M) is 105 and the digital signature (Y) is 239.

The digital signature Y for message M may be verified by a classical computer by revealing the X-component for another equation, for example, G(x)=z30 that intersects the polynomial at the same point. Referring to FIG. 3, the polynomial point (8, 239) and the linear equation G(x)–30X with point (8, 240) are not an exact match, but may be close enough for a classical computer to verify the digital signature Y for message M as authentic.

FIG. 4 is a flow diagram depicting a method for combining capabilities of classical and quantum computers to establish secure communications over a network, according to some arrangements. Additional, fewer, or different operations may be performed in the method depending on the particular arrangement. In some arrangements, some or all operations of method 400 may be performed by one or more processors executing on one or more computing devices, systems, or servers. In some arrangements, method 400 may be performed by one or more classical computers, such as classical computer 101 in FIG. 1A. In some arrangements, some or all operations of method 400 may be performed by one or more quantum computers, such as quantum computer 104 in FIG. 1A. In some arrangements, some or all operations of method 400 may be performed by one or more simulated quantum computers, such as simulated quantum computer 106 in FIG. 1A. Each operation may be re-ordered, added, removed, or repeated.

As shown in FIG. 4, the method 400 includes the operation 402 of receiving, by a classical computer via a network, a request for client data associated with a client device. The method also includes the operation 404 of encrypting, by the classical computer responsive to the request, the client data using a cryptographic key to generate an encrypted data packet. The method also includes the operation 406 of transmitting, by the classical computer via the network, the encrypted data packet to a quantum computer, the encrypted data packet causing the quantum computer to decrypt the encrypted data packet to recover a decrypted data packet.

FIG. 5 is a flow diagram depicting a method for combining capabilities of classical and quantum computers to establish secure communications over a network, according to some arrangements. Additional, fewer, or different operations may be performed in the method depending on the particular arrangement. In some arrangements, some or all operations of method 500 may be performed by one or more processors executing on one or more computing devices, systems, or servers. In some arrangements, method 500 may be performed by one or more classical computers, such as classical computer 101 in FIG. 1A. In some arrangements, some or all operations of method 500 may be performed by one or more quantum computers, such as quantum computer 104 in FIG. 1A. In some arrangements, some or all operations of method 500 may be performed by one or more simulated quantum computers, such as simulated quantum computer 106 in FIG. 1A. Each operation may be re-ordered, added, removed, or repeated.

As shown in FIG. 5, the method 500 includes the operation 502 of transmitting, via a network and by a classical computer to a quantum computer, a request for client data associated with a client device, the request causing the quantum computer to retrieve client data associated with the client device, generate a signed data packet by digitally signing the client data, and transmit the signed data packet to the classical computer. The method also includes the operation 504 of verifying, by the classical computer and based on the signed data packet, an authenticity of the signed data packet.

FIG. 6 is a flow diagram depicting a method for digitally signing a message, according to some arrangements. Additional, fewer, or different operations may be performed in the method depending on the particular arrangement. In some arrangements, some or all operations of method 600 may be performed by one or more processors executing on one or more computing devices, systems, or servers. In some arrangements, method 600 may be performed by one or more classical computers, such as classical computer 101 in FIG. 1A. In some arrangements, some or all operations of method 600 may be performed by one or more quantum computers, such as quantum computer 104 in FIG. 1A. In some arrangements, some or all operations of method 600 may be performed by one or more simulated quantum computers, such as simulated quantum computer 106 in FIG. 1A. Each operation may be re-ordered, added, removed, or repeated.

As shown in FIG. 6, the method 600 includes the operation 602 of computing, by the quantum computer, a coefficient associated with the client data. The method also includes the operation 604 of generating, by the quantum computer and based on the coefficient, an equation relating a plurality of parameter values to a plurality of digital signatures. The method also includes the operation 606 of randomly selecting, by the quantum computer and using the equation, a parameter value from the plurality of parameter values. The method also includes the operation 608 of computing, by the quantum computer and using the equation, a digital signature corresponding to the selected parameter value.

FIG. 7 is a flow diagram depicting a method for verifying a digital signature of a message, according to some arrangements. Additional, fewer, or different operations may be performed in the method depending on the particular arrangement. In some arrangements, some or all operations of method 700 may be performed by one or more processors executing on one or more computing devices, systems, or servers. In some arrangements, method 700 may be performed by one or more classical computers, such as classical computer 101 in FIG. 1A. In some arrangements, some or all operations of method 700 may be performed by one or more quantum computers, such as quantum computer 104 in FIG. 1A. In some arrangements, some or all operations of method 700 may be performed by one or more simulated quantum computers, such as simulated quantum computer 106 in FIG. 1A. Each operation may be re-ordered, added, removed, or repeated.

As shown in FIG. 7, the method 700 includes the operation 702 of receiving, by the classical computer, a second equation associated with the first equation, the signed data packet, and the selected parameter value. The method also includes the operation 704 of computing, by the classical computer and using the second equation, the digital signature corresponding to the selected parameter value.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

It is also understood that any reference to an element herein using a designation such as "first," "second," and so forth does not generally limit the quantity or order of those elements. Rather, these designations can be used herein as, a convenient means of distinguishing between two or more elements or instances of an element. Thus, a reference to first and second elements does not mean that only two elements can be employed, or that the first element must precede the second element in some manner.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method comprising:
    encrypting, by a first classical computer via a network and responsive to a request for client data associated with a client device, the client data using a cryptographic key to generate an encrypted data packet;
    transmitting, by the first classical computer via the network, the encrypted data packet to a second classical computer simulating a quantum computer operation, the encrypted data packet causing the second classical computer to begin a decryption process on the encrypted data packet to recover a decrypted data packet;

determining, by the first classical computer, an absence of a response from the second classical computer occurring within a predefined window of time, the response comprising the decrypted data packet; and transmitting, by the first classical computer via the network responsive to the absence of the response, the encrypted data packet to a quantum computer, the encrypted data packet causing the quantum computer to decrypt the encrypted data packet to recover a decrypted data packet.

2. The method of claim 1, further comprising:

transmitting, by the first classical computer responsive to the absence of the response, a cancelation message to the second classical computer causing the second classical computer to cancel the decryption process on the encrypted data packet.

3. The method of claim 1, further comprising:

transmitting, by the first classical computer via the network, the encrypted data packet to the quantum computer, the encrypted data packet causing the quantum computer to decrypt the encrypted data packet to recover a decrypted data packet.

4. The method of claim 1, wherein the second classical computer simulates the quantum computer by an application executed by the second classical computer.

5. The method of claim 1, the transmitting the encrypted data packet to the quantum computer comprising:

selecting, by the first classical computer based on a processing time associated with decrypting the encrypted data packet by the second classical computer using the resource parameter, the quantum computer to decrypt the encrypted data packet.

6. The method of claim 5, further comprising:

receiving, by the first classical computer, the resource parameter; and determining, by the first classical computer, the processing time.

7. The method of claim 5, further comprising:

comparing, by the classical computer, the processing time to a predetermined threshold value to determine whether the processing time exceeds the predetermined threshold value.

8. The method of claim 5, wherein the available resources are associated with at least one of a computing processing unit (CPU), a memory space, and a hard disk space.

9. A system comprising:

one or more processors of a first classical computer, and one or more computer-readable storage mediums storing instructions which, when executed by the one or more processors, cause the one or more processors to:

encrypt, via a network and responsive to a request for client data associated with a client device, the client data using a cryptographic key to generate an encrypted data packet;

transmit, via the network, the encrypted data packet to a second classical computer simulating a quantum computer operation, the encrypted data packet causing the second classical computer to begin a decryption process on the encrypted data packet to recover a decrypted data packet;

determine an absence of a response from the second classical computer occurring within a predefined window of time, the response comprising the decrypted data packet; and transmit, via the network responsive to the absence of the response, the encrypted data packet to a quantum computer, the encrypted data packet causing the quantum computer to decrypt the encrypted data packet to recover a decrypted data packet.

10. The system of claim 9, the one or more processors further to:

transmit, responsive to the absence of the response, a cancelation message to the second classical computer causing the second classical computer to cancel the decryption process on the encrypted data packet.

11. The system of claim 9, the one or more processors further to:

transmit, via the network, the encrypted data packet to the quantum computer, the encrypted data packet causing the quantum computer to decrypt the encrypted data packet to recover a decrypted data packet.

12. The system of claim 9, wherein the second classical computer simulates the quantum computer by an application executed by the second classical computer.

13. The system of claim 9, the one or more processors further to:

select, based on a processing time associated with decrypting the encrypted data packet by the second classical computer using the resource parameter, the quantum computer to decrypt the encrypted data packet.

14. The system of claim 13, the one or more processors further to:

receive the resource parameter; and determine the processing time.

15. The system of claim 13, the one or more processors further to:

compare the processing time to a predetermined threshold value to determine whether the processing time exceeds the predetermined threshold value.

16. The system of claim 13, wherein the available resources are associated with at least one of a computing processing unit (CPU), a memory space, and a hard disk space.

17. A non-transitory computer-readable storage medium storing instructions which, when executed by one or more processors of a first classical computer, cause the one or more processors to perform operations comprising:

encrypting, by the first classical computer via a network and responsive to a request for client data associated with a client device, the client data using a cryptographic key to generate an encrypted data packet;

transmitting, by the first classical computer via the network, the encrypted data packet to a second classical computer simulating a quantum computer operation, the encrypted data packet causing the second classical computer to begin a decryption process on the encrypted data packet to recover a decrypted data packet;

determining, by the first classical computer, an absence of a response from the second classical computer occurring within a predefined window of time, the response comprising the decrypted data packet; and transmitting, by the first classical computer via the network responsive to the absence of the response, the encrypted data packet to a quantum computer, the encrypted data packet causing the quantum computer to decrypt the encrypted data packet to recover a decrypted data packet.

18. The non-transitory computer-readable storage medium of claim 17, the operations further comprising:

transmitting, by the first classical computer responsive to the absence of the response, a cancelation message to the second classical computer causing the second classical computer to cancel the decryption process on the encrypted data packet.

19. The non-transitory computer-readable storage medium of claim 17, storing one or more instructions executable by the one or more processors to further:

transmitting, by the first classical computer via the network, the encrypted data packet to the quantum computer, the encrypted data packet causing the quantum computer to decrypt the encrypted data packet to recover a decrypted data packet.

20. The non-transitory computer-readable storage medium of claim 17, storing one or more instructions executable by the one or more processors to further:

selecting, by the first classical computer based on a processing time associated with decrypting the encrypted data packet by the second classical computer using the resource parameter, the quantum computer to decrypt the encrypted data packet.

\* \* \* \* \*